(12) United States Patent
Yatsugi et al.

(10) Patent No.: US 12,242,999 B2
(45) Date of Patent: Mar. 4, 2025

(54) HISTORY MANAGEMENT METHOD AND HISTORY MANAGEMENT SYSTEM FOR WATER TREATMENT MEMBERS

(71) Applicant: KUBOTA CORPORATION, Osaka (JP)

(72) Inventors: Soichiro Yatsugi, Amagasaki (JP); Shinya Nagae, Tokyo (JP)

(73) Assignee: KUBOTA CORPORATION, Osaka (JP)

( * ) Notice: Subject to any disclaimer, the term of this patent is extended or adjusted under 35 U.S.C. 154(b) by 165 days.

(21) Appl. No.: 17/920,970

(22) PCT Filed: Apr. 30, 2021

(86) PCT No.: PCT/JP2021/017142
§ 371 (c)(1),
(2) Date: Oct. 24, 2022

(87) PCT Pub. No.: WO2021/230098
PCT Pub. Date: Nov. 18, 2021

(65) Prior Publication Data
US 2023/0169444 A1   Jun. 1, 2023

(30) Foreign Application Priority Data

May 12, 2020   (JP) .................. 2020-083772

(51) Int. Cl.
*G06Q 10/0832* (2023.01)
*G06Q 10/087* (2023.01)
*B01D 61/00* (2006.01)
*C02F 1/44* (2023.01)

(52) U.S. Cl.
CPC ....... *G06Q 10/0832* (2013.01); *G06Q 10/087* (2013.01); *B01D 61/00* (2013.01); *C02F 1/44* (2013.01)

(58) Field of Classification Search
CPC .. G06Q 10/0832; G06Q 10/087; B01D 61/00; C02F 1/44; C02F 1/283; C02F 2209/008; C02F 2209/445; C02F 3/1273
(Continued)

(56) References Cited

U.S. PATENT DOCUMENTS

2005/0263589 A1   12/2005   Kikuchi
2007/0203808 A1   8/2007   Sekimoto et al.
(Continued)

FOREIGN PATENT DOCUMENTS

CN   104573974 A      4/2015
JP   2005335910 A  *  12/2005   ............. G06Q 10/08
(Continued)

OTHER PUBLICATIONS

NFC Anti-Metal PVC Stickers—Fully Waterproof, Tag NFC Wholesale, <https://www.tagnfc.com/en/shop/70-nfc-anti-metal-pvc-stickers-fully-waterproof>; <https://web.archive.org/web/20151114040609/https://www.tagnfc.com/en/shop/70-nfc-anti-metal-pvc-stickers-fully-waterproof> with Wayback on Nov. 14, 2015 (Year: 2015).*
(Continued)

*Primary Examiner* — Jeff Zimmerman
*Assistant Examiner* — Brian A Tallman
(74) *Attorney, Agent, or Firm* — Oliff PLC (57) ABSTRACT

A history management method for water treatment members includes: a first step of, during a shipping process of placing each water treatment member in the accommodating member, registering each water treatment member identification information in the information recording section of an information management device in association with accommodating member identification information for the accommodating member and attaching, to the accommodating member, a tag from which the accommodating member identification information is readable; and a second step of, during a receiving process of attaching each water treatment member accommodated in the accommodating member to the water treatment apparatus, registering the water treatment member identification information, which is obtained (Continued)

from the information recording section based on the accommodating member identification information read from the tag, in the information recording section in association with water treatment apparatus identification information for the water treatment apparatus.

11 Claims, 7 Drawing Sheets

(58) Field of Classification Search
USPC .......................................................... 705/332
See application file for complete search history.

(56) References Cited

U.S. PATENT DOCUMENTS

2010/0170853 A1* 7/2010 Bauder ................... C22B 7/006
210/668

2020/0339438 A1* 10/2020 Lautzenheiser ......... C02F 1/006
2021/0300739 A1* 9/2021 Surjaatmadja .......... B66F 9/063

FOREIGN PATENT DOCUMENTS

| JP | 2008246285 A | * 10/2008 |
| JP | 2012-148229 A | 8/2012 |
| JP | 2012-183470 A | 9/2012 |
| WO | 2005/115890 A1 | 12/2005 |

OTHER PUBLICATIONS

Wouters, J. W., and K. J. Agema. "RFID technology as cost-effective real-time process monitoring and control tool in continuous sand filters: two case studies." Jul. 2018. (Year: 2018).*
Jun. 15, 2021 Search Report issued in International Patent Application No. PCT/JP2021/017142.
Nov. 15, 2022 International Preliminary Report on Patentability issued in International Patent Application No. PCT/JP2021/017142.

* cited by examiner

HISTORY MANAGEMENT METHOD AND HISTORY MANAGEMENT SYSTEM FOR WATER TREATMENT MEMBERS

TECHNICAL FIELD

The present invention relates to a history management method and a history management system for water treatment members, and more particularly to a history management method and a history management system for water treatment members that use history information for the management, where the history information includes water treatment member identification information for individually identifying a plurality of water treatment members attachable to a water treatment apparatus.

BACKGROUND ART

A water treatment apparatus is equipped with a plurality of replaceable water treatment members. Each water treatment member requires various types of maintenance, such as cleaning it when its performance has degraded and replacing it with a new one when it is damaged or nears the end of its life.

In the field of water treatment including purification treatment of organic wastewater, such water treatment apparatuses include a membrane unit equipped with a plurality of membrane modules for solid-liquid separation to extract treated water from biologically treated wastewater and an activated carbon unit equipped with a plurality of activated carbon cartridges for advanced treatment of the treated water extracted by the membrane unit. The membrane unit and the activated carbon unit are ones of the water treatment apparatuses, and the membrane modules and the activated carbon cartridges are ones of the water treatment members.

As an example of the membrane unit, Patent Literature 1 discloses a membrane separation device including: membrane modules each including a plurality of membrane elements; a frame body accommodating the membrane modules by stacking the membrane modules in multiple stages; a closing member closing an end portion of the frame body so as to prevent the membrane modules accommodated in the frame body from being released; and an elastic member disposed in the frame body such that the elastic member is elastically deformed in a vertical direction in a state where the end portion of the frame body is closed.

CITATION LIST

Patent Literature

Patent Literature 1: Japanese Unexamined Patent Application Publication No. 2012-148229

SUMMARY OF INVENTION

Technical Problem

For appropriate maintenance of the water treatment members attached to the above-described water treatment apparatus, it is necessary to individually manage the history of each water treatment member, from its manufacture to its use. For this purpose, a need exists for managing the water treatment members by assigning identification information to each of them.

However, using an approach of attaching labels each indicating different identification information to the respective water treatment members or imprinting identification information on the water treatment members would not only require cumbersome work for that purpose but also require a cumbersome checking process that requires an operator to pull the water treatment apparatus out of the wastewater to be treated and visually check, or read with a scanner, the identification information assigned to the individual water treatment members. In addition, it may be difficult to read the identification information if the labels or the like attached to the water treatment members have been soiled.

Also, attaching electronic components such as IC tags to the water treatment members would not only require providing sufficient waterproofing for the water treatment members but also require employing long-life electronic components that can last for a ten-year lifetime of the water treatment members. As such, this approach leads to an increased component cost.

In addition, in cases where, for example, water treatment members are attached to another water treatment apparatus different from the one to which they were initially attached, it is necessary to manage a ledger of the history of individual water treatment members, including the attachment history, cleaning history, and cumulative usage time, which is a strenuous task.

In a large-scale water treatment facility employing a large number of water treatment apparatuses in particular, it has been very difficult to manage the history of individual water treatment members.

In view of the above problems, it is an object of the present invention to provide a history management method and a history management system for water treatment members that allow for accurate, easy, and yet inexpensive management of the history of the water treatment members from their manufacture to their use.

Solution to Problem

To solve the above problems, as a first feature of a history management method for water treatment members, the method uses history information for management, the history information including water treatment member identification information for individually identifying a plurality of water treatment members attachable to a water treatment apparatus, and includes: by use of an information management device configured to be capable of registering, in an information recording section, the water treatment member identification information, accommodating member identification information for individually identifying an accommodating member for transportation configured to accommodate a group of water treatment members, and water treatment apparatus identification information for individually identifying the water treatment apparatus, a first step of, during a shipping process of placing the group of water treatment members in the accommodating member, registering each water treatment member identification information for each water treatment member included in the group of water treatment members in the information recording section in association with accommodating member identification information for the accommodating member and attaching, to the accommodating member, a tag from which the accommodating member identification information is readable; and a second step of, during a receiving process of attaching the group of water treatment members accommodated in the accommodating member to the water treatment apparatus, registering the water treatment member identification information, which is obtained from the information recording section based on the accommodating member identification information read from the tag, in the information recording section in association with water treatment apparatus identification information for the water treatment apparatus.

Water treatment member identification information, accommodating member identification information, and water treatment apparatus identification information are registered in the information recording section provided in the information management device. A plurality of water treatment members manufactured at a factory are accommodated in an accommodating member and shipped, and the shipped water treatment members are attached to a water treatment apparatus installed at the shipping destination. At the first step during a shipping process, water treatment member identification information for each water treatment member included in a group accommodated in each accommodating member is registered in the information recording section in association with accommodating member identification information for each accommodating member. Also, a tag containing accommodating member identification information is attached to each accommodating member. At the second step during a receiving process, accommodating member identification information is read from the tag attached to each accommodating member, water treatment member identification information for each water treatment member included in the group of water treatment members accommodated in the accommodating member corresponding to the accommodating member identification information is identified from the information recording section, and each water treatment member identification information is registered in the information recording section in association with water treatment apparatus identification information for a water treatment apparatus to which each water treatment member is attached. Accordingly, at least each water treatment member can be accurately managed via the accommodating member identification information and the water treatment member identification information registered in the information recording section, from its manufacture through a shipping phase to a receiving phase where each water treatment member is attached to a specific water treatment apparatus.

In addition to the first feature above, the history management method for water treatment members in accordance with the present invention has a second feature that the water treatment apparatus includes a water treatment block formed with a frame member configured to be assemblable or disassemblable and allow a plurality of water treatment members to be attached thereto, the water treatment apparatus identification information registered in the information recording section includes water treatment block identification information for individually identifying the water treatment block, and a number of water treatment members included in the group of water treatment members accommodated in the accommodating member is set to a number of water treatment members accommodatable in the water treatment block.

A group of water treatment members is accommodated in an accommodating member and shipped as a unit, attached to a water treatment block, and a plurality of water treatment blocks constitute one water treatment apparatus. Accordingly, each water treatment member identification information for each water treatment member included in the group of water treatment members is associated with water treatment apparatus identification information via accommodating member identification information and water treatment block identification information.

In addition to the second feature above, the history management method for water treatment members in accordance with the present invention has a third feature that the accommodating member is formed with the frame member.

A group of water treatment members is accommodated in the frame member constituting the water treatment block and transported from the manufacturing site to the site of use, where the group of water treatment members is assembled in this state into a water treatment apparatus. This eliminates the need for providing a separate accommodating member when shipping the group of water treatment members.

In addition to the first or second feature above, the history management method for water treatment members in accordance with the present invention has a fourth feature that the information management device is further configured to be capable of registering, in the information recording section, accommodating member address information indicative of where in each accommodating member each water treatment member is accommodated and water treatment apparatus address information indicative of where in the water treatment apparatus each water treatment member is attached, at the first step, each water treatment member identification information for each water treatment member included in the group of water treatment members is registered in the information recording section in association with accommodating member identification information for the accommodating member and the accommodating member address information, and at the second step, the water treatment member identification information is registered in the information recording section in association with water treatment apparatus identification information for the water treatment apparatus and the water treatment apparatus address information.

Each water treatment member identification information for each water treatment member included in the group of water treatment members is individually associated via the accommodating member address information and the water treatment apparatus address information, which allows for individual management of which water treatment member is attached to which location in the water treatment apparatus.

In addition to any one of the first to fourth features above, the history management method for water treatment members in accordance with the present invention has a fifth feature that the tag includes any one of an IC tag, a barcode tag, and a character information tag.

In the case of employing IC tags, such as RFID tags, for the tag attached to the accommodating member, the information contained on the tag can be easily read via wireless communication. In the case of employing barcode tags, the information contained on the tag can be easily read with a barcode reader. In the case of employing character information tags, the information contained on the tag can be easily read by using OCR or similar technology.

In addition to any one of the first to fourth features above, the history management method for water treatment members in accordance with the present invention has a sixth feature that the water treatment member identification information includes a unique manufacturing management number associated with manufacturing lot management information for the water treatment members, and the history information includes water treatment apparatus identification information, a start time of use, an operation history, a cleaning history, and a failure history that are associated with the water treatment member identification information.

Information required for history management of each water treatment member, including which water treatment apparatus it is attached to, when it was put into service, how it has been operated or cleaned, and what kind of failure it has experienced, is registered in the information recording section. This provides an appropriate understanding of the degree of degradation of each water treatment member.

In addition to any one of the first to sixth features above, the history management method for water treatment members in accordance with the present invention has a seventh feature that each water treatment member is imprinted with a manufacturing lot management number.

The history of each water treatment member can be known from the water treatment member identification information registered in the information recording section, but any loss of the water treatment member identification information from the information recording section may lead to a failure to know each water treatment member. Even in such a case, imprinting the manufacturing lot management number on each water treatment member will at least provide for minimum required management based on the manufacturing lot management number.

In addition to any one of the first to seventh features above, the history management method for water treatment members in accordance with the present invention has an eighth feature that each of the water treatment members is a membrane module, and the water treatment apparatus is a membrane unit to which the membrane module is attached.

When the water treatment member is a membrane module and the water treatment apparatus is a membrane unit to which the membrane module is attached, efficient maintenance is possible by knowing the history of the membrane module via the water treatment member history information.

As a first feature of a history management system for water treatment members, the system uses history information for management, the history information including water treatment member identification information for individually identifying each water treatment member attachable to a water treatment apparatus, and includes: an information recording section configured to be capable of registering the water treatment member identification information, accommodating member identification information for individually identifying an accommodating member for transportation configured to accommodate a group of water treatment members, and water treatment apparatus identification information for individually identifying the water treatment apparatus; and an information management device connected to the information recording section, wherein the information management device includes: a shipping processing section configured to, during a shipping process of placing the group of water treatment members in the accommodating member, register each water treatment member identification information for each water treatment member included in the group of water treatment members in the information recording section in association with accommodating member identification information for the accommodating member; a tag writing processing section configured to write the accommodating member identification information into a tag attached to the accommodating member; and a receiving processing section configured to, during a receiving process of attaching the group of water treatment members accommodated in the accommodating member to the water treatment apparatus, register the water treatment member identification information, which is read from the information recording section based on the accommodating member identification information read from the tag, in the information recording section in association with water treatment apparatus identification information for the water treatment apparatus.

In addition to the first feature above, the history management system for water treatment members in accordance with the present invention has a second feature that the information management device is further configured to be capable of registering, in the information recording section, accommodating member address information indicative of where in each accommodating member each water treatment member is accommodated and water treatment apparatus address information indicative of where in the water treatment apparatus each water treatment member is attached, the shipping processing section is configured to, during the shipping process, register each water treatment member identification information for each water treatment member included in the group of water treatment members in the information recording section in association with accommodating member identification information for the accommodating member and the accommodating member address information, and the receiving processing section is configured to, during the receiving process, register the water treatment member identification information in the information recording section in association with water treatment apparatus identification information for the water treatment apparatus and the water treatment apparatus address information.

In addition to the first or second feature above, the history management system for water treatment members in accordance with the present invention has a third feature that each of the water treatment members is a membrane module, and the water treatment apparatus is a membrane unit to which the membrane module is attached.

Advantageous Effects of Invention

As described above, the present invention provides a history management method and a history management system for water treatment members that allow for accurate, easy, and yet inexpensive management of the history of the water treatment members from their manufacture to their use.

MODE FOR CARRYING OUT THE INVENTION

The history management method and the history management system for water treatment members of the present invention are described below, by way of example with respect to a membrane unit as an example of the water treatment apparatus. The membrane unit is equipped with membrane modules as water treatment members in a replaceable manner.

[Configuration of the Membrane Unit]

Figure 1A:
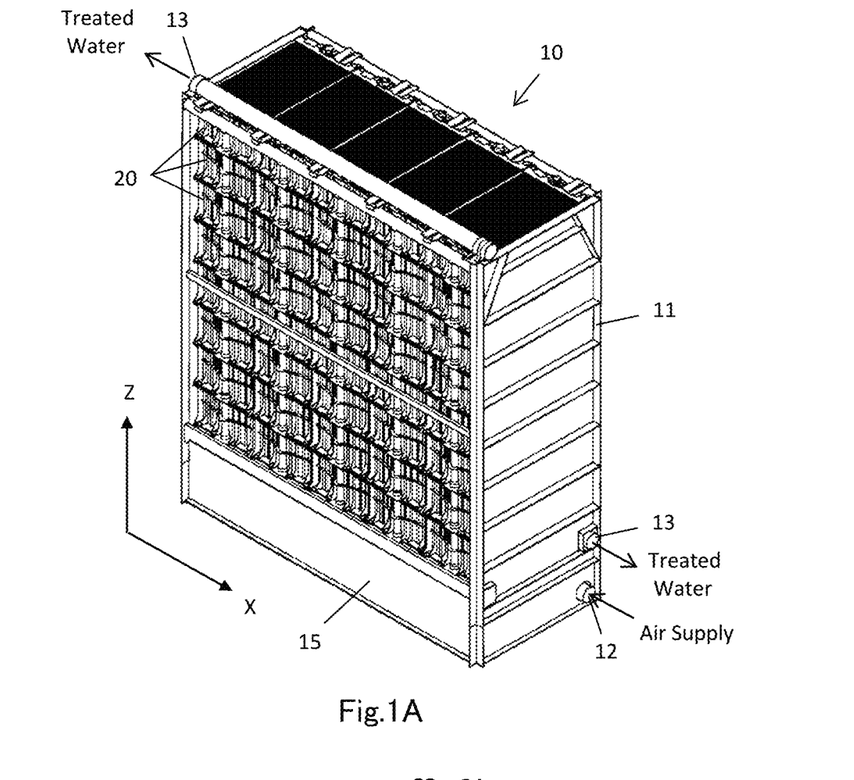
FIG. 1A illustrates a membrane unit.
Figure 1B:
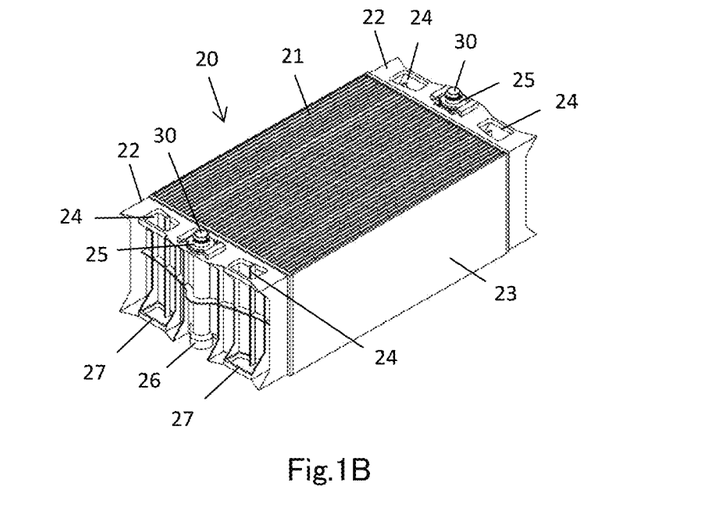
FIG. 1B illustrates a membrane module.

FIGS. 1A and 1B illustrate exteriors of the membrane unit 10 and the membrane module 20 attached to the membrane unit 10. In the membrane unit 10, five membrane module groups, each consisting of eight tiers of vertically stacked membrane modules 20, are laterally juxtaposed and accommodated in a frame body 11. The membrane unit 10 is a device to extract treated water by being submerged in a biological reaction tank and filtering a liquid to be treated in the biological reaction tank through the membrane modules 20.

The membrane module 20 includes a pair of front and rear water collection cases 22 at both ends in the depth direction of a main frame constituting the frame body 11. A plurality of vertically oriented membrane elements 21 are horizontally juxtaposed within a space defined by a pair of side plates 23 disposed between the pair of water collection cases 22.

Each membrane element 21 includes a filtration membrane on both sides of a flat filter plate and is configured such that treated water having permeated through the filtration membrane is guided into each water collection case 22 through water collection passages formed in the filter plate. The filter plate is made of ABS resin or the like, and the filtration membrane includes a nonwoven fabric as a base material, where the nonwoven fabric is impregnated with porous resin. The water collection case 22 is made of polypropylene or the like to be translucent to allow for easy viewing of the interior of the water collection case 22.

Each water collection case 22 is formed in a hollow shape having therein a water collection space and includes connecting portions 25 and 26 on its top and bottom surfaces, respectively. The connecting portions 25 and 26 are in communication with the water collection space. The upper connecting portion 25 is configured to be fitted with a connecting member 30 that is to be engaged into the lower connecting portion 26 of the water collection case 22 of the membrane module 20 stacked directly above.

Each of the top and bottom surfaces of the water collection case 22 is formed with a pair of right and left engagement holes 24 as engaged portions. The engagement holes 24 are formed on the top and bottom surfaces of the water collection case 22 such that they adjoin engagement holes 24 of upper and lower adjacent membrane modules 20 when the membrane modules 20 are stacked on each other. The engagement holes 24 are configured to be engageable by passing each engaging portion 42 of a hanging jig 40 (described below) through the respective engagement holes 24 while the engagement holes 24 are adjoining the engagement holes 24 of the upper and lower adjacent membrane modules 20. The edges of the engagement holes 24 serve as handles 27 for an operator to grasp the membrane module.

A diffuser air supply pipe 12 is provided below the lowest membrane module 20. Air supplied from the diffuser air supply pipe 12 is diffused through an air diffuser portion 15 having an air diffuser head, bringing about a cross-flow stream of the liquid to be treated in the biological reaction tank between the plurality of vertically oriented membrane elements 21 horizontally juxtaposed in each membrane module 20, whereby the membrane surface is purified. Then, the permeate having permeated through the membrane surface of each membrane element 21 is led out of the tank through a water collection pipe 13.

The water collection pipe 13 is in communication with a permeate delivery pipe (not shown) that leads to a treated water tank located outside the biological treatment tank, and a pump device is located on that pipeline intermediately between these tanks. The diffuser air supply pipe 12 is in communication with an air supply source such as a blower and a compressor.

Figure 2:
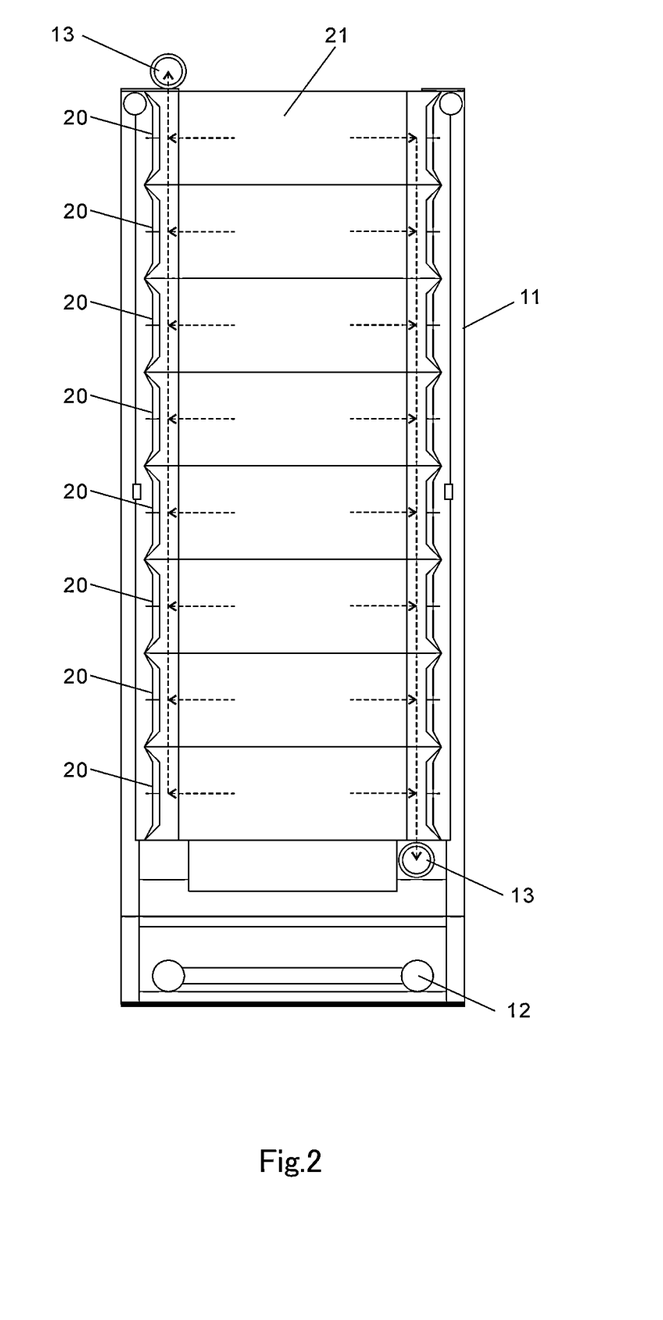
FIG. 2 illustrates a side view of the membrane unit.

As shown in FIG. 2, the upper connecting portion 25 (see FIG. 1B) of the uppermost membrane module 20 on the left side and the lower connecting portion 26 (see FIG. 1B) of the lowermost membrane module 20 on the right side are each connected to the water collection pipe 13. The lower connecting portion 26 of the uppermost membrane module 20 on the left side and the upper connecting portion 25 of the lower most membrane module 20 on the right side are each sealed with a sealing member. In FIG. 2, the illustrations of the upper connecting portion 25 and the lower connecting portion 26 are omitted, and flow directions of the permeate are indicated by dashed arrows.

In this example, the membrane modules 20 are vertically stacked in eight tiers and laterally juxtaposed in five rows, but the number of tiers and rows can be set as appropriate. For example, the membrane unit 10 can include the membrane modules 20 vertically stacked in twelve tiers and laterally juxtaposed in five rows, or can include the membrane modules 20 vertically stacked in sixteen tiers and laterally juxtaposed in five rows. A large-scale water treatment facility can be constructed by disposing a plurality of such membrane units 10.

Figure 3A:
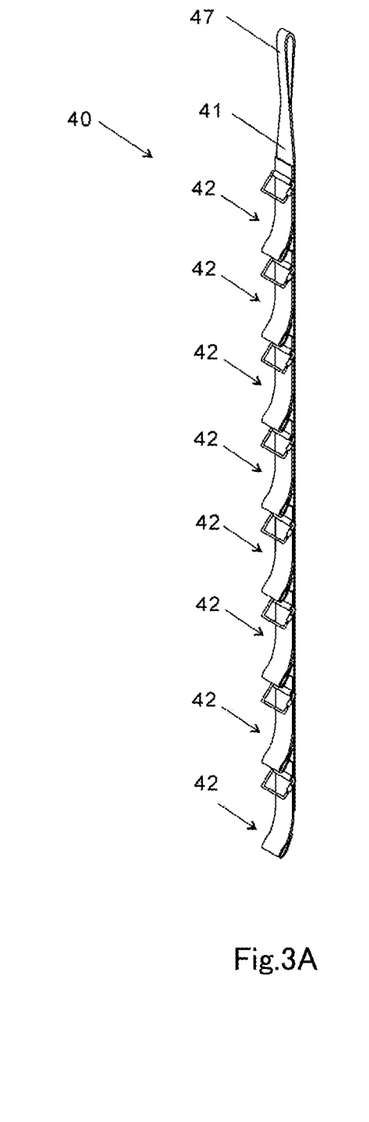
FIG. 3A illustrates a hanging jig.
Figure 3B:
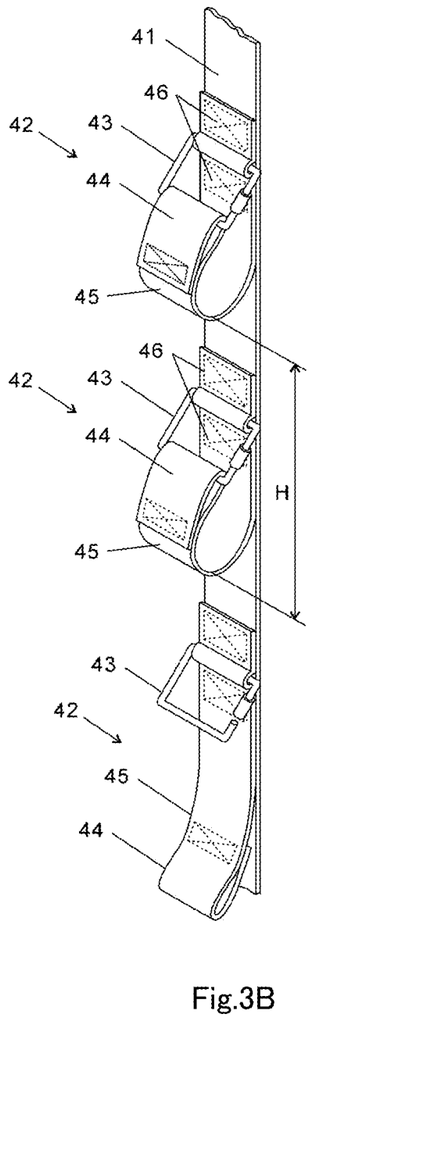
FIG. 3B illustrates engaging portions of the handing jig.

FIGS. 3A and 3B illustrate a hanging jig 40 for hanging the vertically stacked membrane modules 20. The hanging jig 40 includes an elongate base member 41 and a plurality of engaging portions 42 that are engageable with and disengageable from the engagement holes 24 in the respective membrane modules 20 stacked in multiple tiers. In the present embodiment, the base member 41 includes eight engaging portions 42. That is, the number of engaging portions 42 is equal to the number of tiers of the membrane modules 20 stacked in the body frame of the membrane unit 10. An annular portion 47 is formed at an upper end of the base member 41, and the hanging jig 40 is used with the annular portion 47 engaged with a hook or the like.

The engaging portion 42 is configured with an engaging ring 43 and a sling strip 45. The sling strip 45 is formed at its one end with a ring portion 44 to be inserted into the engaging ring 43 and is sewn at its other end to the base member 41. The engaging ring 43 is fixed to a sewn portion 46 where the sling strip 45 is sewn to the base member 41.

Figure 4A:
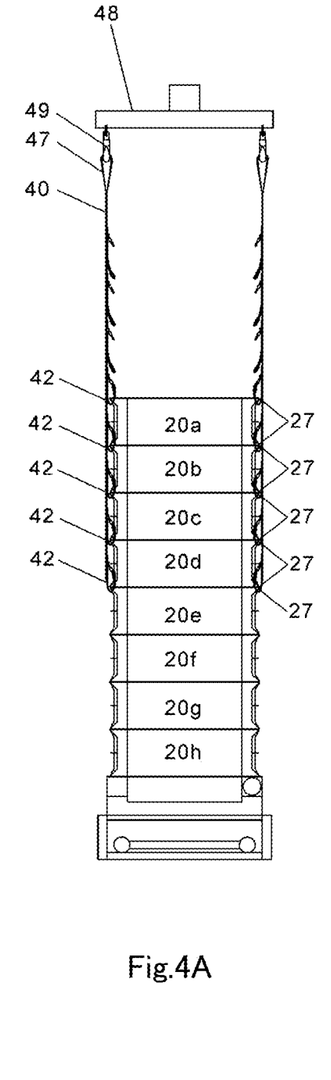
FIGS. 4A and 4B illustrate how the handing jig is used.
Figure 4B:
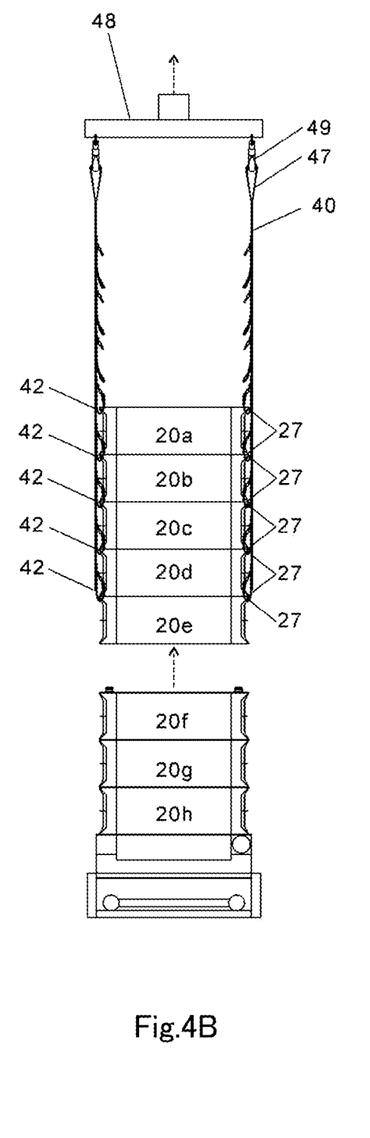

FIGS. 4A and 4B illustrate part of a procedure for replacing a particular tier of the membrane modules using the hanging jig 40 described above. When a membrane module 20e at the fifth tier from the top of a group of membrane modules stacked in eight tiers (20a-20h) is to be replaced, first, the engaging portions 42 of the hanging jig 40 are engaged, on both right and left sides of the membrane module group, with the engagement holes 24 of the respective membrane modules from the membrane module 20a at the uppermost tier to the membrane module 20e at the particular tier.

A hanging beam 48 suspended in a crane includes four hooks 49 to lift the membrane modules 20 in a quadrilateral orientation, and the hanging jig 40 is engaged with each of the hooks 49.

By lifting the hanging beam 48 engaged with the four hanging jigs 40, the membrane module 20a at the uppermost tier through the membrane module 20e at the particular tier are separated from the remaining membrane modules 20f, 20g, 20h.

Then, the membrane modules 20a through 20e are placed on a base, and the membrane module 20e is replaced with a new one, followed by lifting the hanging beam 48, moving it to a position above the membrane modules 20f, 20g, 20h, and lowering it. This completes the replacement work for the membrane module 20e. The specific configuration of the hanging jig 40 is not limited to the above one, which requires an operator to wind the handing jig 40 around the membrane modules 20. The handing jig 40 may be configured with engaging portions that allow a machine, such as a robot, to automatically hook the membrane modules 20 thereon without the operator intervention, and a mechanical device that can perform automatic replacement may be used.

[Lifetime Management of the Membrane Modules]

In an operational state where the permeate is extracted by the membrane unit 10 submerged in the biological treatment tank, a membrane filtration state and a refresh state are repeated at predetermined intervals. The membrane filtration state refers to a state where the pump is driven to extract the permeate, and the refresh state refers to a state where the extraction of the permeate is stopped and only air is diffused to purify the membrane surface. Also, when there is a high degree of clogging in the membrane modules 20 due to a long period of use, the membrane performance is restored by supplying a cleaning liquid from the water collection pipe 13 and performing a backwash.

Although the membrane module 20 has a very long life of about ten years, its filtration performance may degrade or it may be damaged as the cumulative operating time increases. Also, the degree of degradation varies depending on which location in the frame body 11 of the membrane unit 10 the membrane module 20 is attached to. For example, the load on the membrane module 20 attached in a lower portion of the frame body 11 tends to be greater than that on the membrane module 20 attached in an upper portion of the frame body 11.

For this reason, it is important to know the remaining life of each membrane module 20 by managing the history of each membrane module 20 from its manufacture to its most recent use. Also, frequent replacements of the membrane modules 20 in each of the plurality of membrane units 10 may not only involve very cumbersome maintenance work but also hinder the stable operation. Therefore, a history management method and a history management system for the membrane modules 20 have been developed.

[History Management System for Membrane Modules]

Figure 5:
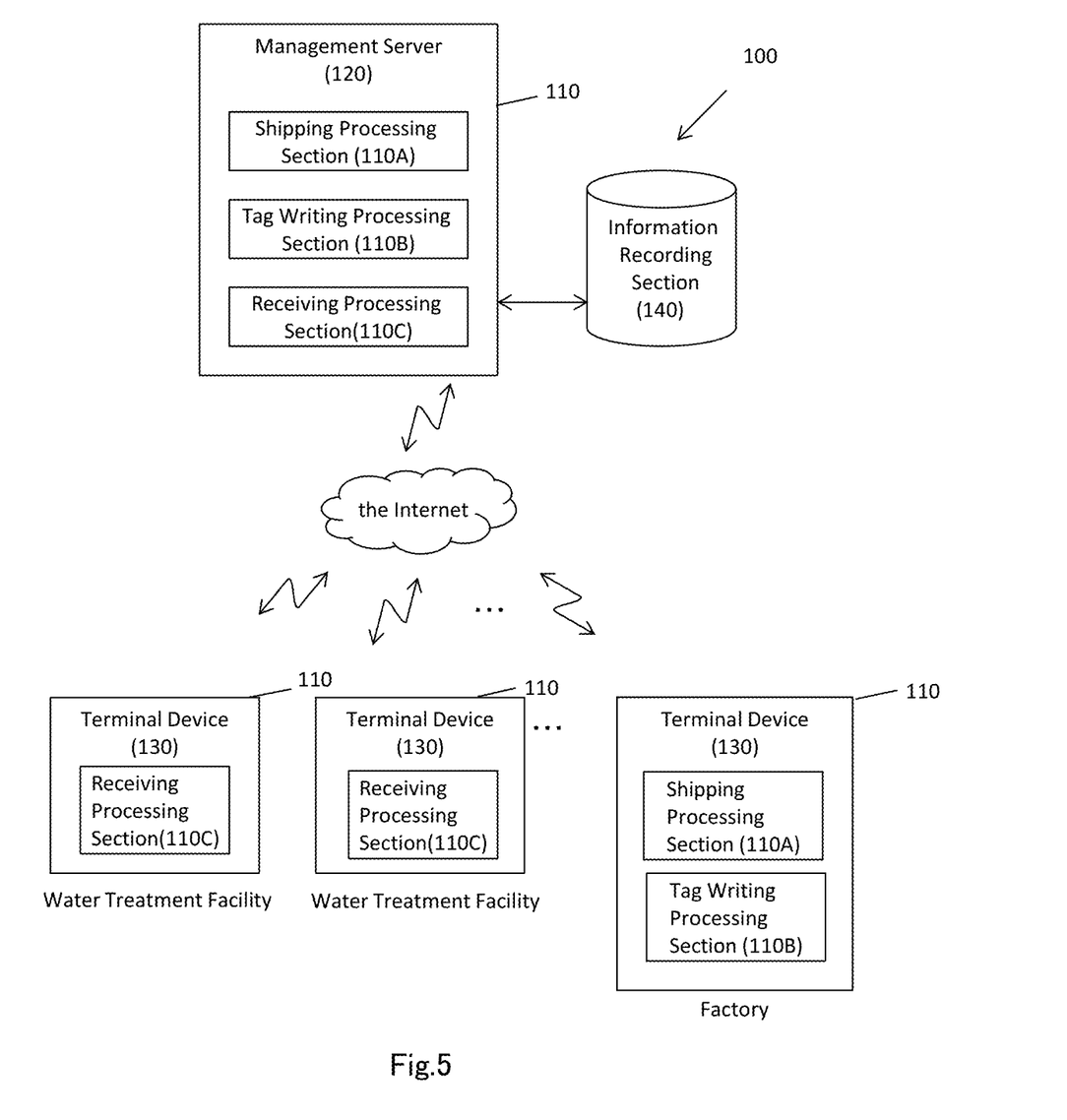
FIG. 5 illustrates functional blocks of a history management system for the membrane modules.

As shown in FIG. 5, the history management system 100 for the membrane modules includes a management server 120 and a plurality of terminal devices 130 that can communicate with the management server 120. The management server 120 manages each membrane module 20 individually using history information. The history information includes membrane module identification information for individually identifying each membrane module 20 attachable to each of the plurality of membrane units 10. The management server 120 and the plurality of terminal devices 130 constitute information management devices 110.

The management server 120 is connected to an information recording section 140. The information recording section 140 is a database system in which information such as the history information including the membrane module identification information, accommodating member identification information, and membrane unit identification information is registered. The management server 120 and each terminal device 130 are connected via a communication medium such as the Internet.

The terminal device 130 is installed in each water treatment facility where the membrane unit 10 is located and in each factory where the membrane modules 20 are manufactured.

The membrane module identification information includes manufacturing lot management numbers and manufacturing management numbers. The manufacturing lot management numbers are used to manage the manufacturing factories and the time of manufacture, and the manufacturing management numbers are used to uniquely identify individual membrane modules and manage the specific date of their manufacture. The information recording section 140 stores manufacturing management information that associates the manufacturing lot management number with information including the manufacturing factory, the time of manufacture, and the manufacturing management number. These pieces of information are transmitted from the terminal device 130 installed in the membrane module manufacturing factory to the management server 120, and stored in the information recording section 140 via the management server 120.

The membrane module history information includes, in addition to the membrane module identification information described above, membrane unit identification information, a start time of use, an operation history, a cleaning history, and a failure history that are associated with the membrane module identification information. The membrane unit identification information refers to identification information for individually identifying membrane units equipped with the membrane modules. The membrane module history information can be used to know which individual membrane modules are attached to which membrane unit, how long they have been in service, how much they have been used, how many times they have been cleaned, and what kind of failures they have experienced.

The operation history, cleaning history, and failure history are time-stamped to indicate when each of these events occurred. The information including the membrane unit identification information, the start time of use, the operation history, the cleaning history, and the failure history is transmitted from the terminal device 130 installed in each water treatment facility to the management server 120, and stored in the information recording section 140 via the management server 120.

The accommodating member identification information refers to management information for individually identifying each accommodating member 50 (see FIGS. 6A-6C) that is used to transport a group of membrane modules 20 manufactured at a factory to a destination water treatment facility. A tag T containing the accommodating member identification information is attached to the accommodating member. The accommodating member identification information associated with each membrane module identification information for a group of concurrently accommodated membrane modules 20 is recorded in the information recording section 140 so that the group of membrane modules accommodated in the accommodating member 50 can be identified from reading the information contained on the tag T (see FIGS. 6A-6C) attached to the accommodating member 50.

Figure 6A:
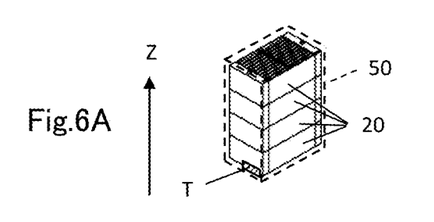
FIGS. 6A-6C illustrate a group of membrane modules each accommodated in an accommodating member.

FIGS. 6A-6C illustrate several embodiments of the accommodating member 50. In FIG. 6A, four tiers of membrane modules 20, which are half of the eight tiers of the membrane modules 20 stacked vertically in the membrane unit 10 shown in FIGS. 1A and 1B, are handled as a group of membrane modules constituting a package unit and accommodated in the accommodating member 50 (indicated by broken lines) as a packaging container, in which the membrane modules 20 are transported from the factory to the water treatment facility. The tag T containing the accommodating member identification information is attached to the accommodating member 50.

Figure 6B:
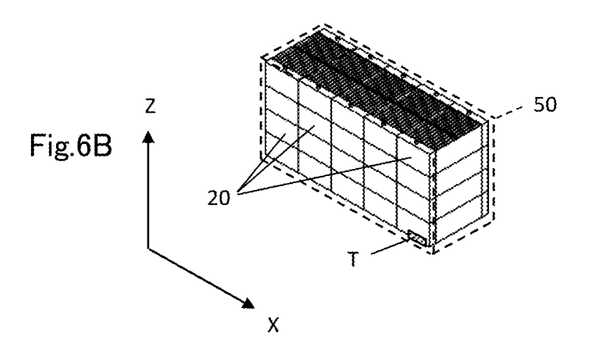

In FIG. 6B, five rows of four tiers of membrane modules 20, which are half of the eight tiers of the membrane modules 20 stacked vertically in the membrane unit 10 shown in FIGS. 1A and 1B, are handled as a group of membrane modules constituting a package unit and accommodated in the accommodating member 50 (indicated by broken lines) as a packaging container, in which the membrane modules 20 are transported from the factory to the water treatment facility. The tag T containing the accommodating member identification information is attached to the accommodating member 50.

Figure 6C:
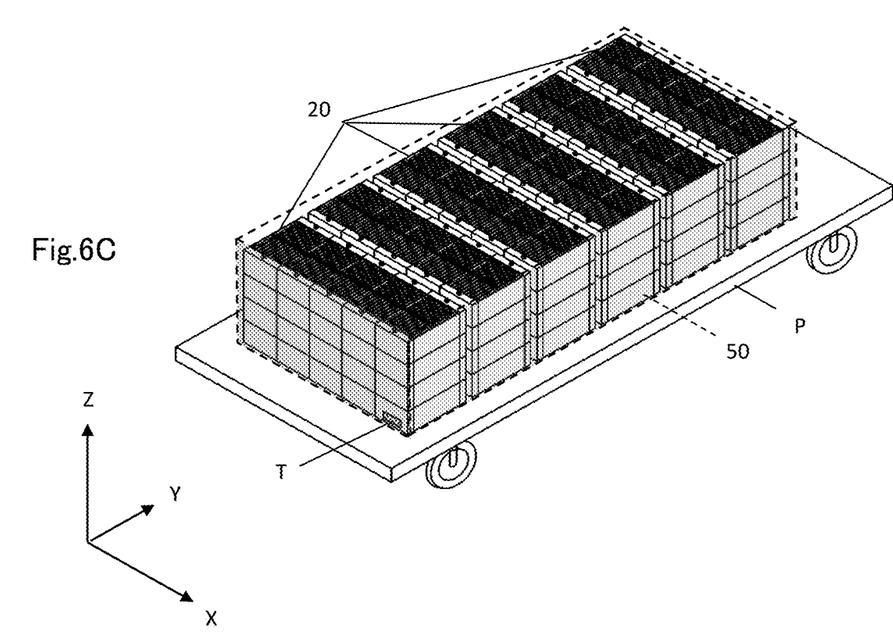

In FIG. 6C, six sets of membrane modules 20, each including five rows of four tiers of membrane modules 20, are handled as a group of membrane modules constituting a package unit and collectively accommodated in the accommodating member 50, which is loaded on a pallet and transported from the factory to the water treatment facility. The tag T containing the accommodating member identification information is attached to the accommodating member 50.

At shipment from the factory, the accommodating member identification information that can individually identify each accommodating member 50 is generated by the terminal device 130 installed in the factory and is written into the tag T in association with membrane module identification information for each membrane module 20 included in the group of membrane modules 20 accommodated in the corresponding accommodating member 50. The accommodating member identification information is transmitted to the management server 120, which in turn stores it in the information recording section 140. Since the accommodating member identification information is stored in the information recording section 140 in association with the membrane module identification information, an implementation is also possible where only the accommodating member identification information is written into the tag T.

Any of IC tags, barcode tags, and character information tags is used as the tag T. In the case of employing IC tags, such as RFID tags, for the tag T attached to the accommodating member 50, the information contained on the tag can be written and read via wireless communication. In the case of employing barcode tags including two-dimensional barcodes such as QR codes®, the information contained on the tag can be easily read with a barcode reader. In the case of employing character information tags, the information contained on the tag can be easily read by using OCR or similar technology. The barcode tags and character information tags can be easily issued using a printer. Characters (such as alphabets), numbers, symbols, or combinations thereof can be used as the character information to be contained on the character information tag.

The membrane unit identification information is information for uniquely identifying each membrane unit 10. The membrane unit identification information includes the manufacturing management number and a model name of each membrane unit 10 and information that identifies the water treatment facility in which each membrane unit 10 is installed. The membrane unit identification information is transmitted from the terminal device 130 installed in the water treatment facility to the management server 120, which in turn stores it in the information recording section 140.

The information management device 110 (120, 130) includes, as needed, functional blocks of a shipping processing section 110A, a tag writing processing section 110B, and a receiving processing section 110C.

The shipping processing section 110A is a functional block to register membrane module identification information for each membrane module included in a group of membrane modules 20 in the information recording section 140 in association with the accommodating member identification information for the accommodating member 50, during a shipping process of placing the group of membrane modules 20 in the accommodating member 50. The shipping processing section 110A is implemented by the management server 120 and the terminal device 130 installed in the factory. As described above, the management server 120 performs the registration with the information recording section 140 at the shipment from the factory based on the information transmitted from the terminal device 130 installed in the factory.

The tag writing processing section 110B is a functional block to write the accommodating member identification information into the tag T attached to the accommodating member 50. The tag writing processing section 110B is implemented by the management server 120 and the terminal device 130 installed in the factory. As described above, the terminal device 130 installed in the factory writes the accommodating member identification information and the membrane module identification information into the tag T at the shipment from the factory and transmits the information to the management server 120, which in turn registers the accommodating member identification information and the membrane module identification information in the information recording section 140.

The receiving processing section 110C is a functional block to register the membrane module identification information, which is read from the information recording section 140 based on the accommodating member identification information read from the tag T, in the information recording section in association with the membrane unit identification information for the membrane unit 10 during a receiving process of attaching the group of membrane modules 20 accommodated in the accommodating member 50 to the membrane unit 10. The receiving processing section 110C is implemented by the management server 120 and the terminal device 130 installed in each water treatment facility. In cases where the membrane module identification information is also stored in the tag T in association with the accommodating member identification information, there is no need to read the membrane module identification information from the information recording section 140.

The information management device 110 is further configured to be capable of registering, in the information recording section 140, accommodating member address information indicative of where in each accommodating member 50 each membrane module 20 is accommodated and a membrane unit address information indicative of where in each membrane unit 10 each membrane module is attached.

During the shipping process, the shipping processing section 110A registers, in the information recording section 140, the membrane module identification information for each membrane module 20 included in the group of membrane modules 20 in association with the accommodating member identification information for the accommodating member 50 and the accommodating member address information.

For example, referring to the accommodating member 50 in FIG. 6A, the accommodating member address information is set with numerical values of 1, 2, 3, and 4 along the Z-axis from the bottom to the top. Based on the locations of the membrane modules 20 accommodated in the accommodating member 50, the shipping processing section 110A associates the accommodating member identification information, the accommodating member address information, and the membrane module identification information with each other.

For example, referring to the accommodating member 50 in FIG. 6B, the accommodating member address information is set with combinations of numerical values identified by (X, Z) along the Z-axis from the bottom to the top and the X-axis perpendicular to the Z-axis. The vertically stacked membrane modules 20 at the foremost in the figure are given the accommodating member address information (5, 1), (5, 2), (5, 3), and (5, 4) in this order from the bottom to the top, and each accommodating member address information is associated with the corresponding membrane module identification information.

For example, referring to the accommodating member 50 in FIG. 6C, the accommodating member address information is set with combinations of numerical values identified by (X, Y, Z) along the Z-axis from the bottom to the top and the X- and Y-axes perpendicular to the Z-axis. The vertically stacked membrane modules 20 at the foremost in the figure are given the accommodating member address information (5, 1, 1), (5, 1, 2), (5, 1, 30), and (5, 1, 4) in this order from the bottom to the top, and each accommodating member address information is associated with the corresponding membrane module identification information.

During the receiving process, the receiving processing section 110C registers, in the information recording section 140, the membrane module identification information in association with the membrane unit identification information for the membrane unit 10 and the membrane unit address information.

For example, referring to the membrane unit 10 in FIG. 1A, forty membrane unit addresses from (1, 1) to (5, 8) can be defined by combinations of numerical values identified by (X, Z) along the Z-axis from the bottom to the top and the X-axis perpendicular to the Z-axis.

During the receiving process, the receiving processing section 110C tracks each membrane module 20 having the membrane module identification information identified by the corresponding accommodating member address as to which membrane unit address in which membrane unit 10 the membrane module 20 has been attached to, and converts the accommodating member address into the membrane unit address to identify which membrane module 20 having which membrane module identification information has been attached to which location in which membrane unit 10. Thus, the receiving processing section 110C registers, in the information recording section 140, the identified membrane module identification information in association with the membrane unit identification information for the membrane unit 10 and the membrane unit address information.

When the arrangement of the membrane modules 20 accommodated in the accommodating member 50 is consistent with the arrangement of the membrane modules 20 attached to the membrane unit 10 as shown in FIGS. 6A-6C, the aforementioned address conversion process can be easily performed.

When the frame body 11 shown in FIG. 1A is configured to be disassembled and divided into, for example, an upper frame body containing twenty membrane modules 20 consisting of five rows of upper four tiers of the membrane modules 20 and a lower frame body containing twenty membrane modules 20 consisting of five rows of lower four tiers of the membrane modules 20, forming the accommodating member 50 with the frame body 11 facilitates management during the shipping and receiving processes. The way in which the frame body 11 is divided is not limited to the above example; for example, the frame body 11 may be configured to be divided in the X-direction into five frame bodies each containing eight membrane modules 20 stacked in the Z-direction in one-row, eight-tier arrangement.

That is, the membrane unit 10 preferably includes a plurality of water treatment blocks formed with a frame member as a frame body configured to be assemblable or disassemblable and allow a plurality of membrane modules 20 to be attached thereto, each membrane unit identification information registered in the information recording section 140 preferably includes water treatment block identification information that individually identifies each water treatment block, and the number of membrane modules 20 included in a group accommodated in the accommodating member 50 is preferably set to the number of membrane modules accommodatable in the water treatment block. In addition, the accommodating member 50 is preferably formed with the frame member.

Alternatively, the components constituting the membrane module 20, such as the water collection case 22 and the side plate 23, may be made of a rigid material to provide the membrane module 20 itself with functionality as a frame, so that a separate dedicated frame can be eliminated. In such cases, for example, the plurality of membrane modules 20 themselves can also serve as the accommodating member 50.

Figure 7:
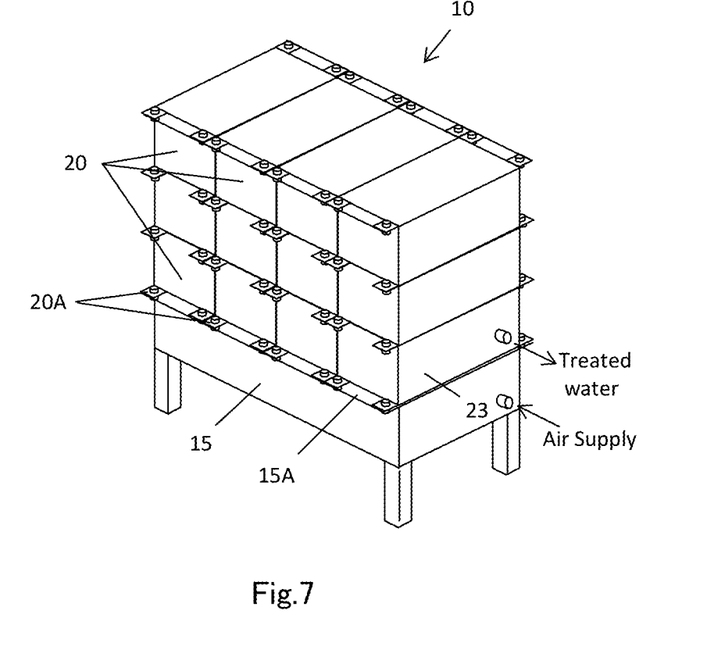
FIG. 7 illustrates another embodiment of the membrane unit, where the membrane modules themselves serve as frames.

As one of such examples, FIG. 7 illustrates the membrane unit 10 where the membrane module groups, each consisting of three tiers of vertically stacked membrane modules 20, are laterally juxtaposed in four rows. Each membrane module 20 has a casing including side plates 23, where the casing is made of a rigid material, e.g., a hard resin such as acrylic resin. Upper and lower membrane modules 20 are bolted together via attaching lugs 20A extending forward and backward from each casing. The membrane modules 20 are bolted to a flange 15A of the air diffuser portion 15 via the attaching lugs 20A of the membrane modules 20 at the lowest tier.

For example, when the operation of placing each membrane module 20 in the accommodating member 50 is automated by a robotic device and the operation of removing each membrane module 20 from the accommodating member 50 and attaching it to the membrane unit 10 is also automated by a robotic device, performing an address conversion process of converting accommodating member addresses into membrane unit addresses in advance facilitates automatically attaching each membrane module 20 to an address within the membrane unit 10 for which the address conversion has been performed.

When the address conversion process is not performed in advance, the robotic device may store the address of the membrane module 20 removed from the accommodating member 50 and the membrane unit address in the membrane unit to which that membrane module 20 has been attached, and the address conversion may be performed during or after completion of the operation.

A controller of the robotic device may be incorporated into the terminal device 130 installed in the water treatment facility, or may be configured to communicate with the terminal device 130 such that the addresses converted by the controller of the robotic device are transmitted to the terminal device 130.

For example, in cases where an operator performs the tasks of placing each membrane module 20 in the accommodating member 50, the operator may enter and associate the addresses in the accommodating member 50 and the corresponding membrane unit addresses via a portable computer such as a tablet, every time a series of tasks is completed.

For example, the tasks of removing each membrane module 20 from the accommodating member 50 and attaching it to the membrane unit 10 may be recorded in the form of video data, and the video data may be subjected to image processing for automatic address conversion.

The above technique allows for accurate, easy, and yet inexpensive management of the history of individual membrane modules from their manufacture to their use, without the need for dedicated devices (such as IC tags) to be attached to the respective membrane modules.

The present invention is applicable not only when membrane modules necessary for constructing a new membrane unit in a water treatment facility are accommodated in a transport member at the factory and transported to the water treatment facility and all these membrane modules are attached to that membrane unit, but also when replacement membrane modules are accommodated in a transport member at the factory and transported to the water treatment facility and any of membrane modules in an existing membrane unit is replaced with a certain membrane module.

Only the accommodating member identification information and the membrane unit identification unit may be used to manage the membrane modules without the accommodating member address information and the membrane unit address information, in which case the membrane modules attached to each membrane unit can be identified on a per membrane unit-basis.

However, it is preferred that a manufacturing lot management number for each membrane module 20 is imprinted on any portion of each membrane module 20 such as the surface of the water collection case 22 or the side plate 23. The history of each membrane module 20 can be known from the membrane module identification information registered in the information recording section 140, but any loss of the membrane module identification information from the information recording section 140 may lead to a failure to know the history of each membrane module 20 and other information. Even in such a case, imprinting the manufacturing lot management number on each membrane module 20 will at least provide for minimum required management based on the manufacturing lot management number.

The history management method and the history management system for the membrane modules, which are water treatment members, have been described above with respect to the membrane unit as an example of the water treatment apparatus. However, the water treatment members are not limited to the membrane modules, and the prevent invention is applicable to other water treatment members such as a plurality of activated carbon cartridges attached to an activated carbon unit. Also, the present invention is applicable to either a single or plurality of water treatment apparatuses.

That is, the history management method for water treatment members according to the present invention is a history management method for water treatment members that uses history information for management, the history information including water treatment member identification information for individually identifying a plurality of water treatment members attachable to a water treatment apparatus. The method includes, by use of an information management device configured to be capable of registering, in an information recording section, the water treatment member identification information, accommodating member identification information for individually identifying an accommodating member for transportation configured to accommodate a group of water treatment members, and water treatment apparatus identification information for individually identifying the water treatment apparatus: a first step of, during a shipping process of placing the group of water treatment members in the accommodating member, registering each water treatment member identification information for each water treatment member included in the group of water treatment members in the information recording section in association with accommodating member identification information for the accommodating member and attaching, to the accommodating member, a tag from which the accommodating member identification information is readable; and a second step of, during a receiving process of attaching the group of water treatment members accommodated in the accommodating member to the water treatment apparatus, registering the water treatment member identification information, which is obtained from the information recording section based on the accommodating member identification information read from the tag, in the information recording section in association with water treatment apparatus identification information for the water treatment apparatus.

The water treatment apparatus preferably includes a plurality of water treatment blocks formed with a frame member configured to be assemblable or disassemblable and allow a plurality of water treatment members to be attached thereto. The water treatment apparatus identification information registered in the information recording section preferably includes water treatment block identification information for individually identifying each water treatment block. The number of water treatment members included in the group of water treatment members accommodated in the accommodating member is preferably set to the number of water treatment members accommodatable in the water treatment block.

The accommodating member is preferably formed with the frame member. Also, the information management device is preferably further configured to be capable of registering, in the information recording section, accommodating member address information indicative of where in each accommodating member each water treatment member is accommodated and water treatment apparatus address information indicative of where in the water treatment apparatus each water treatment member is attached. At the first step, each water treatment member identification information for each water treatment member included in the group of water treatment members is preferably registered in the information recording section in association with the accommodating member identification information for the accommodating member and the accommodating member address information. At the second step, the water treatment member identification information is preferably registered in the information recording section in association with the water treatment apparatus identification information for the water treatment apparatus and the water treatment apparatus address information.

The water treatment member identification information preferably includes a unique manufacturing management number associated with manufacturing lot management information for the water treatment members, and the history information preferably includes water treatment apparatus identification information, a start time of use, an operation history, a cleaning history, and a failure history that are associated with the water treatment member identification information.

The history management system for water treatment members according to the present invention is a history management system for water treatment members that uses history information for management, the history information including water treatment member identification information for individually identifying each water treatment member attachable to a water treatment apparatus. The system includes: an information recording section configured to be capable of registering the water treatment member identification information, accommodating member identification information for individually identifying an accommodating member for transportation configured to accommodate a group of water treatment members, and water treatment apparatus identification information for individually identifying the water treatment apparatus; and an information management device connected to the information recording section. The information management device includes: a shipping processing section configured to, during a shipping process of placing the group of water treatment members in the accommodating member, register each water treatment member identification information for each water treatment member included in the group of water treatment members in the information recording section in association with accommodating member identification information for the accommodating member; a tag writing processing section configured to write the accommodating member identification information into a tag attached to the accommodating member; and a receiving processing section configured to, during a receiving process of attaching the group of water treatment members accommodated in the accommodating member to the water treatment apparatus, register the water treatment member identification information, which is read from the information recording section based on the accommodating member identification information read from the tag, in the information recording section in association with water treatment apparatus identification information for the water treatment apparatus.

The information management device is preferably further configured to be capable of registering, in the information recording section, accommodating member address information indicative of where in each accommodating member each water treatment member is accommodated and water treatment apparatus address information indicative of where in the water treatment apparatus each water treatment member is attached. The shipping processing section is preferably configured to, during the shipping process, register each water treatment member identification information for each water treatment member included in the group of water treatment members in the information recording section in association with accommodating member identification information for the accommodating member and the accommodating member address information. The receiving processing section is preferably configured to, during the receiving process, register the water treatment member identification information in the information recording section in association with water treatment apparatus identification information for the water treatment apparatus and the water treatment apparatus address information.

The above embodiment is merely an example of the invention, and the descriptions of the embodiment do not limit the scope of the present invention. Various changes and modifications can be made to the components discussed herein as appropriate to the extent that such changes and modifications still provide the functions and benefits of the present invention.

REFERENCE SIGNS LIST

10 Water treatment apparatus (membrane unit)
11 Frame body
20 Water treatment member (membrane module)
100 History management system
110 Information management device
110A Shipping processing section
110B Tag writing processing section
110C Receiving processing section
120 Management server (information management device)
130 Terminal device (information management device)
140 Information recording section

The invention claimed is:

1. An assembly and management method for water treatment members that uses history information for management, the history information including water treatment member identification information for individually identifying a plurality of water treatment members attachable to a water treatment apparatus, the method comprising:
   providing an accommodating container for transportation configured to accommodate a group of water treatment members;
   attaching a tag to the accommodating container;
   by use of an information management device, registering, in a storage, the water treatment member identification information, accommodating container identification information for individually identifying the accommodating container, and water treatment apparatus identification information for individually identifying the water treatment apparatus;
   placing the group of water treatment members in the accommodating container;
   registering each water treatment member identification information for each water treatment member included in the group of water treatment members in the storage in association with the accommodating container identification information for the accommodating container, wherein the tag is configured to store and make readable the accommodating container identification information;
   attaching the group of water treatment members accommodated in the accommodating container to the water treatment apparatus;
   registering the water treatment member identification information, which is obtained from the storage based on the accommodating container identification information read from the tag, in the storage in association with water treatment apparatus identification information for the water treatment apparatus;
   operating the water treatment apparatus so that organic wastewater flows through the water treatment members and the organic wastewater is purified; and
   wherein the history includes an operation history of the water treatment members, and the method further comprises storing the operation history in the storage associated with the tag as the water treatment apparatus is operated to purify the organic wastewater.

2. The assembly and management method for water treatment members according to claim 1, wherein
   the water treatment apparatus includes a water treatment block formed with a frame configured to be assemblable or disassemblable and allow a plurality of water treatment members to be attached thereto, the water treatment apparatus identification information registered in the storage includes water treatment block identification information for individually identifying the water treatment block, and a number of water treatment members included in the group of water treatment members accommodated in the accommodating container is set to a number of water treatment members accommodatable in the water treatment block.

3. The assembly and management method for water treatment members according to claim 2, wherein the accommodating container is formed with the frame.

4. The assembly and management method for water treatment members according to claim 1, wherein the storage is further configured to register, in the storage, accommodating container address information indicative of where in each accommodating container each water treatment member is accommodated and water treatment apparatus address information indicative of where in the water treatment apparatus each water treatment member is attached, wherein each water treatment member identification information for each water treatment member included in the group of water treatment members is registered in the storage in association with accommodating member identification information and the accommodating container address information for the accommodating container, and wherein the water treatment member identification information is registered in the storage in association with water treatment apparatus identification information and the water treatment apparatus address information for the water treatment apparatus.

5. The assembly and management method for water treatment members according to claim 1, wherein the tag comprises any one of an IC tag, a barcode tag, and a character information tag.

6. The assembly and management method for water treatment members according to claim 1, wherein the water treatment member identification information includes a unique manufacturing management number associated with manufacturing lot management information for the water treatment members, and the history information includes water treatment apparatus identification information, a start time of use, the operation history, a cleaning history, and a failure history that are associated with the water treatment member identification information.

7. The assembly and management method for water treatment members according to claim 1, wherein each water treatment member is imprinted with a manufacturing lot management number.

8. The assembly and management method for water treatment members according to claim 1, wherein each of the water treatment members is a membrane module, and the water treatment apparatus is a membrane unit to which the membrane module is attached.

9. An assembly and management system for water treatment members that uses history information for management, the history information including water treatment member identification information for individually identifying each water treatment member attachable to a water treatment apparatus, the system comprising:

an accommodating container for transportation configured to accommodate a group of water treatment members;

a tag that is attached to the accommodating container;

a storage configured to register the water treatment member identification information, accommodating container identification information for individually identifying an accommodating container for transportation configured to accommodate a group of water treatment members, and water treatment apparatus identification information for individually identifying the water treatment apparatus;

an information management device connected to storage, wherein the information management device includes a professor programmed to:

during a process of placing the group of water treatment members in the accommodating container, register each water treatment member identification information for each water treatment member included in the group of water treatment members in the storage in association with accommodating container identification information for the accommodating container;

write the accommodating container identification information into the tag attached to the accommodating container; and during a receiving process of attaching the group of water treatment members accommodated in the accommodating container to the water treatment apparatus, register the water treatment member identification information, which is read from the storage based on the accommodating container identification information read from the tag, in the storage in association with water treatment apparatus identification information for the water treatment apparatus; and the water treatment apparatus;

wherein the water treatment apparatus is configured to permit organic wastewater to flow through the water treatment members and purify the organic wastewater, and wherein the history includes an operation history of the water treatment members, and the operation history is stored in the storage associated with the tag as the water treatment apparatus is operated to purify the organic wastewater.

10. The assembly and management system for water treatment members according to claim 9, wherein the information management device is further configured to register, in the storage, accommodating container address information indicative of where in each accommodating container each water treatment member is accommodated and water treatment apparatus address information indicative of where in the water treatment apparatus each water treatment member is attached, the processor is further programmed to register each water treatment member identification information for each water treatment member included in the group of water treatment members in the storage in association with accommodating container identification information for the accommodating container and the accommodating container address information, and the processor is further programmed to, during the receiving process, register the water treatment member identification information in the storage in association with water treatment apparatus identification information for the water treatment apparatus and the water treatment apparatus address information.

11. The assembly and management system for water treatment members according to claim 9, wherein each of the water treatment members is a membrane module, and the water treatment apparatus is a membrane unit to which the membrane module is attached.

\* \* \* \* \*